United States Patent
Mejri et al.

(10) Patent No.: US 10,484,133 B2
(45) Date of Patent: Nov. 19, 2019

(54) METHODS AND SYSTEMS FOR DECODING A DATA SIGNAL BASED ON THE GENERATION OF A DECODING TREE

(71) Applicant: INSTITUT MINES TELECOM, Paris (FR)

(72) Inventors: Asma Mejri, Antibes (FR); Ghaya Rekaya-Ben Othman, Antony (FR)

(73) Assignee: INSTITUT MINES-TELECOM, Paris (FR)

( * ) Notice: Subject to any disclaimer, the term of this patent is extended or adjusted under 35 U.S.C. 154(b) by 0 days.

(21) Appl. No.: 15/514,576

(22) PCT Filed: Sep. 28, 2015

(86) PCT No.: PCT/EP2015/072280
§ 371 (c)(1),
(2) Date: Mar. 27, 2017

(87) PCT Pub. No.: WO2016/050703
PCT Pub. Date: Apr. 7, 2016

(65) Prior Publication Data
US 2017/0264392 A1 Sep. 14, 2017

(30) Foreign Application Priority Data
Sep. 29, 2014 (EP) .................................... 14306517

(51) Int. Cl.
*H04L 1/00* (2006.01)
*H04L 25/03* (2006.01)
*H04L 27/38* (2006.01)

(52) U.S. Cl.
CPC .......... *H04L 1/0052* (2013.01); *H04L 1/0054* (2013.01); *H04L 25/03197* (2013.01);
(Continued)

(58) Field of Classification Search
CPC ..... H04L 1/0052; H04L 1/0054; H04L 27/38; H04L 25/03197; H04L 25/03203;
(Continued)

(56) References Cited

U.S. PATENT DOCUMENTS 8,432,989 B2 * 4/2013 Prasad ................ H04L 25/0246
375/259

OTHER PUBLICATIONS

C. P. Schnorr and M. Euchner, "Lattice basis reduction: Improved practical algorithms and solving subset sum problems." In Math. Programming, pp. 181-191, 1993.
(Continued)

*Primary Examiner* — Betsey Deppe
(74) *Attorney, Agent, or Firm* — Meagher Emanuel Laks Goldberg & Liao, LLP

(57) ABSTRACT

A decoder or a decoding method for decoding a data signal is provided by iteratively constructing a decoding tree comprising nodes, each representing a component of a symbol of a data signal, each iteration comprising, for a current node of the tree stored in the top of the stack; generating a reference child node of the current node from the data signal; from the reference child node, generating a first and second neighbor child nodes by subtracting/adding a positive integer parameter from/to the value of the reference node; storing in the stack three child nodes derived from the reference, first and second neighbor child nodes, the nodes stored in the stack being ordered by increasing values of a node metric; removing the current node stack; selecting the top node of the stack as the new current node. The data signal is estimated from the stack node information.

15 Claims, 7 Drawing Sheets

(52) U.S. Cl.
CPC .. *H04L 25/03203* (2013.01); *H04L 25/03891* (2013.01); *H04L 27/38* (2013.01); *H04L 2025/03426* (2013.01)

(58) Field of Classification Search
CPC ............ H04L 25/03891; H04B 7/0413; H04B 7/0452; H03M 13/00; H03M 13/03; H03M 13/3977; H03M 13/6502
USPC .................................. 375/341; 714/794, 791
See application file for complete search history.

(56) References Cited

OTHER PUBLICATIONS

K.R. Kumar, G. Caire and A.L. Moustakas, Asymptotic performance of linear receivers in mimo fading channels.' IEEE Transactions on Information Theory, 55(10):4398-4418, Oct. 2009.
Arul Murugan et al., "A unified framework for tree search decoding: rediscovering the sequential decoder", IEEE transaction on information theory, vol. 52, pp. 933-953, Mar. 2006.
F. Jelinek, "A fast sequential decoding algorithm using a stack", IBM Journal Research Development, vol. 13, pp. 675-685, Nov. 1969.
J. -C. Belfiore, G. Rekaya, E. Viterbo, "The Golden Code: A 2×2 Full-Rate Space-Time Code with Non-Vanishing Determinants", IEEE Transactions on Information Theory, vol. 51, No. 4, pp. 1432-1436, Apr. 2005.
International Search Report for PCT/EP2015/0702280, dated Apr. 20, 2016.
International Written Opinion for PCT/EP2015/0702280, dated Apr. 20, 2016.
Rym Ouertani et I: "A Stack algorithm with limited tree-search", Signals, Circuits and Systems (SCS), 2009 3rd International Conference On, IEEE, Piscataway, NJ, USA, Nov. 6, 2009 (Nov. 6, 2009), pp. 1-6.
Walid Abediseid et al: "Lattice sequential decoder for coded MIMO channel: performance and complexity analysis", Proc., IEEE International Symposium on Information Theory, ISIT 2010, IEEE, Piscataway, NJ, USA, Jun. 13, 2010 (Jun. 13, 2010), pp. 2248-2252.
E. Viterbo et al, "A Universal Lattice Code Decoder for Fading Channels", IEEE Transactions on Information Theory, vol. 45, No. 5, Jul. 1999, pp. 1639-1642.
Fano, Robert M., "A Heuristic Discussion of Probabilistic Decoding, IEEE Transactions on Information Theory", vol. 9, No. 2, pp. 64-74, Apr. 1963.
Ge Ben-Othman et al., "The spherical bound stack decoder", IEEE Computer Society, IEEE International Conference on Wireless & Mobile Computing, Networking & Communication, pp. 322-328, Oct. 2008.

* cited by examiner

SYMBOL ERROR RATE

TOTAL COMPLEXITY

METHODS AND SYSTEMS FOR DECODING A DATA SIGNAL BASED ON THE GENERATION OF A DECODING TREE

TECHNICAL FIELD

The invention generally relates to digital communication systems, and in particular to methods, systems, and computer program products for decoding a data signal based on the generation of a decoding tree.

BACKGROUND

One of the most relevant and critical issues in digital communication relates to the design of efficient decoding algorithms. In order to recover useful and intended information, specific digital processing is needed at the receiver side. This applies to all communication systems covering both single and multiple transmissions such as multi-users and multiple-antenna communication systems as MIMO (Multiple-Input Multiple-Output).

Specifically, multiple antenna technologies play a fundamental role in the design of many wireless communication systems due to their potential to increase the spectral efficiency and the transmission data rates. Several wireless standards such as the LTE and the WiMAX (IEEE 802.16) have incorporated MIMO communications to enhance the network performance and take advantage of the diversity brought by multiple antennas. In such systems, the digital signals are sent from a transmitter device to a receiver device in an encoded form through a transmission channel. The receiver device is configured to decode the received signal from the channel output so as to access the data. A main challenge in such systems is the design of efficient and low-complexity detectors.

In particular, the transmission channel can be noisy which may involve a disruption of the received signals. Such disruption can be limited at the decoding side by using a suitable decoding technique to properly decode the received signal. A known decoding technique is the Maximum Likelihood (ML) decoding technique according to which the receiver device is configured to estimate the likeliest candidate signal, given the observed received signal.

Optimal ML decoding technique relies on counting all the possible transmitted signals (also referred to as "candidate signals"), and selecting the likeliest signal according to selection criteria, such as the Euclidean distance between the observed signal received and the candidate signals.

However, such an exhaustive count is costly in terms of time and resources, and can be difficult to implement in real-time applications. Indeed, the number of candidates, and therefore the complexity of the decoder, exponentially increases with the length of the digital signal. For practical implementations, alternative lattice decoding algorithms have been proposed to properly decode the received signal while considering the decoder complexity, such as the Sphere Decoder (E. Viterbo and J. Boutros. A universal lattice code decoder for fading channels. IEEE Transactions on Information Theory, 45(5):1639-1642, July 1999) or the Schnorr-Euchner decoder (C. P. Schnorr and M. Euchner. Lattice basis reduction: Improved practical algorithms and solving subset sum problems. In Math. Programming, pages 181-191, 1993). This class of decoders is particularly adapted to wireless communications involving both single and multiple antennas as well as to optical communications.

Such decoding algorithms implement optimal ML criterion. However, they increase the complexity when the constellation size or the number of antennas increases.

In other existing approaches, suboptimal low-complexity decoders such as the ZF, the ZF-DFE and the MMSE (K. R. Kumar, G. Caire, and A. L. Moustakas. Asymptotic performance of linear receivers in mimo fading channels. IEEE Transactions on Information Theory, 55(10):4398-4418, October 2009) are implemented. Such decoders are generally used in practical systems presenting limited computational capabilities.

Still other decoding techniques have been proposed such as sequential decoding techniques which are based on a tree representation of the ML optimization problem (decoding tree) and on a tree search. In such decoding tree, each path from the root node to a leaf node is a possible transmitted signal. There exist three main tree-search strategies: the breadth-first, the depth-first and the best-first strategy. Nodes in the search tree correspond to different values taken by the decoded symbols and each path from the root node to a leaf node is a possible transmitted signal.

Sequential decoding techniques take into account a cost (or metric) constraint in order to determine a single candidate path inside a decoding tree by assigning a cost to each current node, such as the Euclidean distance between the signal received and the path between the root node and the current node. The search tree is no longer binary and contains the different possible values of the information symbols.

According to a "breadth-first" tree search strategy, the search starts with the root node and extends all its child nodes existing at the following level. For each explored node, the search algorithm extends successively all its child nodes until reaching leaf nodes. With such an approach, at a given level i, all the nodes are explored before moving to the level i−1 of the tree in such a way that all linear combinations $s^{(i)}=(s_n, s_{n-1}, \ldots, s_i)$ are computed (i.e. the search over the tree is made in the width sense). The "breadth-first" strategy thus implements an exhaustive search over the tree.

Another exhaustive tree search strategy called the "Depth-First strategy" and generally used in the Sphere Decoders and Schnorr-Euchner decoders, starts from the root node and explores the first child node $s_n$, then its nearest child node $S_{n-1}$, and so on until reaching a leaf node $s_1$. Given this first path found, the search proceeds by returning back to the level 2 in the tree and explores the neighbor of the already explored node $s_2$. After finding all the possible paths and computing their relative cumulated weights, the shortest path is output.

The "Best First strategy" is still another tree search strategy which corresponds to an optimized version of the Breadth-First strategy. The search strategy is based on exploring only paths having smallest weights than a predefined weight constraint. Starting from the root node, the algorithm explores all child nodes $s_n$ and keeps only the nodes having the weights that satisfy the constraint by storing them in a stack. The child nodes of the top node in the stack are then generated and their cumulated weights are computed. The explored nodes are searched according to their weights and only the nodes with the least cumulated weights are kept. The search is continued until finding a leaf node and the optimal path $s^{(1)}=(s_n, s_{n-1}, \ldots, s_1)$ is returned. By maintaining only the nodes having low weights compared to a given cost constraint, the search complexity is reduced.

Stack decoders were originally used to decode convolutional codes transmitted over discrete memoryless channels. Later on, they were rediscovered and adapted for ML detection in MIMO systems as disclosed in "A unified framework for tree search decoding: rediscovering the sequential decoder", Arul Murugan et al., "IEEE transaction on information theory", volume 52, pages 933-953, March 2006.

Sequential decoding can be implemented in a Fano decoder (R. Fano. A heuristic discussion of probabilistic decoding. IEEE Transactions on Information Theory, 9(2), pages 64-74, April 1963.) or in a stack decoder, delivering a hard estimation of the signal transmitted, i.e. a binary estimation, as described in particular in the article "A fast sequential decoding algorithm using a stack" (F. Jelinek, "IBM Journal Research Development", volume 13, pages 675-685, November 1969).

To generate the decoding tree according to the Best-First tree search strategy, the stack decoder starts from the root node $s_{root}$, and generates at each level all the child nodes corresponding to the detected symbols. The respective weight of each child node is further computed. The child nodes are then stored in a stack in an increasing order of their weights such that the node in the top of the stack has the least metric. The stack is then reordered and the same processing is repeated until a leaf node reaches the top of the stack. The path corresponding to a leaf node represents the ML solution. The stack decoder can thus find the closest vector to the received signal according to the ML criterion.

The Stack decoder has a lower complexity than the Fano decoder (as demonstrated in the article "A fast sequential decoding algorithm using a stack", F. Jelinek, "IBM Journal Research Development", volume 13, pages 675-685, November 1969). However, for an increasing constellation size and a high number of antennas, the stack decoding technique requires a high computational complexity.

In order to reduce this complexity, another decoding technique referred to as the Spherical-Bound Stack decoder (SB-Stack) has been proposed in the article by G. R. Ben-Othman, R. Ouertani, and A. Salah, entitled "The Spherical Bound Stack Decoder", In Proceedings of International Conference on Wireless and Mobile Computing, pages 322-327, October 2008. The SB-stack approach combines the Stack search strategy with the Sphere Decoder search region: The ML solution is sought inside a sphere centered at the received point. Using this approach, the SB-stack decoder achieves lower complexity than the Spherical decoder. However, although the SB-stack decoder offers lower complexity than the Sphere Decoder, its implementation in practical systems requires high storage capacities.

Thus, optimal decoding tree generation methods and systems with a reduced decoding complexity are needed.

SUMMARY

In order to address these and other problems, a method of decoding a received data signal in a communication system is provided, the method comprising: iteratively constructing a decoding tree, each node of the decoding tree corresponding to a component of a symbol of the data signal, and being associated with a metric,
the step of constructing the decoding tree implements at least one iteration of the following steps, for a current node of the tree stored in the top of a stack:
generating a reference child node of the current node from the vector representing the received data signal, from the reference child node, generating a first neighbor child node by subtracting a positive integer parameter from the value of the reference node, and a second neighbor child node by adding the positive integer parameter to the value of the reference child node;
storing in the stack at most three child nodes deriving from the reference child node and from the first and second neighbor child nodes, each child node being stored in the stack in association with node information comprising a predetermined metric, the nodes in the stack being ordered by increasing values of metrics;
removing the current node from the stack;
selecting the top node of the stack as the new current node;
the method further comprising determining an estimation of the data signal from the node information stored in the stack.

In one embodiment, the received data signal corresponds to a transmitted data signal transported by a transmission channel, the transmission channel being associated with a channel matrix H of a given dimension n and a QR decomposition being previously applied to the channel matrix, where Q designates an orthogonal matrix and R an upper triangular matrix, and the step of generating the reference child node comprises projecting the vector representing the received signal on a layer of the upper triangular matrix.

The reference child node may be further generated from the values of the tree nodes comprised in the path from the root node to the current node.

In particular, the step of generating the reference child node may comprise determining the reference child node from the nearest integer of the quantity $$\frac{1}{R_{ii}}\left(\tilde{y}_i - \sum_{j=i+1}^{n} R_{ij}s_j\right),$$

where i designates the level of the reference child node in the tree, $R_{ij}$ represents the component (i,j) of the upper triangular matrix R, and $\tilde{y}_i$ represents the $i^{th}$ component of the received signal $\tilde{y}$.

In certain embodiments, the method may comprise determining the metric ($f(s_i)$) associated with the reference child node ($s_i$) from the weight metrics (($w(s_j)$)) of the nodes in the tree comprised in the path from the root node to the current node.

Specifically, the metric associated with the reference child node ($s_i$) may be represented by the cumulated weight determined from the sum of the weight metrics ($w(s_j)$) of the nodes in the tree comprised in the path from the root node to the current node, the weight metric ($w(s_j)$) of a node at a given level j of the tree being determined as the Euclidean distance between the $j^{th}$ component of the vector $\tilde{y}$ representing the received signal and a vector (($s_n \ldots s_j$)) comprising the nodes of the tree from the root node to the node at level j.

Alternatively, the metrics associated with the reference child node ($s_i$) may be represented by the cumulated weight determined from the sum of the weight metrics ($w(s_j)$) of the nodes in the tree comprised in the path from the root node to the current node, the weight metric ($w(s_j)$) of a node at a level j of the tree being determined as the difference between:
the Euclidean distance between the $j^{th}$ component of the vector $\tilde{y}$ representing the received signal and a vector ($s_n \ldots s_j$) comprising the values of the nodes of the tree from the root node to the node at level j, and the product of a predefined bias parameter b by the level j, the bias parameter being predefined as a real and positive value.

In one embodiment, the step of storing each reference child node in the stack may further comprise storing auxiliary parameters in association with each node in the stack, the auxiliary parameters comprising the node path, and the estimation of the data signal being determined from the node paths stored in the stack.

The step of selecting the top node may further comprise determining if the node selected in the stack is a leaf node and wherein the method comprises:
performing the next iteration if the selected node is not a leaf node, and
terminating the iterations if the selected node is a leaf node.

Alternatively, the step of selecting the top node may comprise determining if the node selected in the stack is a leaf node, the method comprising:
performing the next iteration if the selected node is not a leaf node, and
if the selected node is a leaf node:
removing the leaf node from the stack,
storing the leaf node in an auxiliary stack,
the estimation of the data signal being further performed from the auxiliary stack.

In certain embodiments, the value of each node in the tree may correspond to a component of a symbol belonging to a given constellation having a predefined range between a minimum threshold and a maximum threshold, and the step of generating a child node may comprise determining if the generated nearest integer to the value of child node is comprised between the minimum threshold and the maximum threshold, the method further comprising for at least one of the three generated child nodes:
if the generated nearest integer to the value of the child node is comprised between the minimum threshold and the maximum threshold, setting the child node to the nearest integer value within the constellation range.

In addition, the method may comprise:
if the generated nearest integer to the value of the child node is lower than the predefined minimum threshold, setting the child node value as equal to the minimum threshold;
if the generated nearest integer to the value of child node is higher than the maximum threshold, setting the child node value as equal to the maximum threshold.

In one application, the communication system may be a multi-antenna system and the transmission channel may be associated with a channel matrix H of a given dimension, the received data signal $y_c$ being equal to $H_c s_c + w_c$, with $H_c$, $s_c$ and $w_c$ corresponding respectively to the complex value of the channel matrix H, of the vector s representing the transmitted data signal and of a noise vector w. The received data signal may be then previously transformed into a real-valued representation, the representation being defined by the following formula:

$$y = \begin{bmatrix} \mathcal{R}(H_c) & -\mathcal{J}(H_c) \\ \mathcal{J}(H_c) & \mathcal{R}(H_c) \end{bmatrix} \begin{bmatrix} \mathcal{R}(s_c) \\ \mathcal{J}(s_c) \end{bmatrix} + \begin{bmatrix} \mathcal{R}(w_c) \\ \mathcal{J}(w_c) \end{bmatrix} = Hs + w$$

where $\mathcal{R}(.)$ and $\mathcal{J}(.)$ denote respectively the real and imaginary parts of the complex-valued vector specified as parameter.

There is also provided a computer program product for decoding a received data signal, the computer program product comprising:
a non-transitory computer readable storage medium; and
instructions stored on the non-transitory computer readable storage medium that, when executed by a processor, cause the processor to:
iteratively construct a decoding tree, each node of the decoding tree corresponding to a component of a symbol of the data signal, and being associated with a metric,
the step of constructing the decoding tree implementing at least one iteration of the following steps, for a current node of the tree stored in the top of a stack:
generating a reference child node ($s_i$) of the current node from the vector representing the received data signal,
from the reference child node ($s_i$), generating a first neighbor child node by subtracting a positive integer parameter (p) from the value of the reference node ($s_i$), and a second neighbor child node by adding the positive integer parameter (p) to the value of the reference child node ($s_i$);
storing in the stack at most three child nodes deriving from the reference child node and from the first and second neighbor child nodes, each child node being stored in the stack in association with node information comprising a predetermined metric, the nodes in the stack being ordered by increasing values of metrics;
removing the current node from the stack;
selecting the top node of the stack as the new current node;
the processor being further caused to determine an estimation of the data signal from the node information stored in the stack.

A device for decoding a received data signal is also provided, the device comprising:
at least one processor; and
a memory coupled to the at least one processor and including instructions that, when executed by the at least one processor, cause the device to iteratively construct a decoding tree, each node of the decoding tree corresponding to a component of a symbol of the data signal, and being associated with a metric, wherein the step of constructing the decoding tree implements at least one iteration of the following steps, for a current node of the tree stored in the top of a stack:
generating a reference child node ($s_i$) of the current node from the vector representing the received data signal,
from the reference child node ($s_i$), generating a first neighbor child node by subtracting a positive integer parameter (p) from the value of the reference node ($s_i$), and a second neighbor child node by adding the positive integer parameter (p) to the value of the reference child node ($s_i$);
storing in the stack at most three child nodes deriving from the reference child node and from the first and second neighbor child nodes, each child node being stored in the stack in association with node information comprising a predetermined metric, the nodes in the stack being ordered by increasing values of metrics;
removing the current node from the stack;
selecting the top node of the stack as the new current node;
the device being caused to determine an estimation of the data signal from the node information stored in the stack.

The various embodiments of the invention thus allow to dynamically cross the decoding tree while visiting a reduced number nodes.

Accordingly, a low-complexity sequential decoding can be achieved for linear channels, such as MIMO systems.

The various embodiments of the invention thus allow to dynamically cross the decoding tree while visiting a reduced number nodes.

Accordingly, a low-complexity sequential decoding can be achieved for linear channels, such as MIMO systems.

BRIEF DESCRIPTION OF THE DRAWINGS

The accompanying drawings, which are incorporated herein, constitute a part of this specification and illustrate various embodiments of the invention and, together with the description, serve to explain the embodiments of the invention.

DETAILED DESCRIPTION

Figure 1:
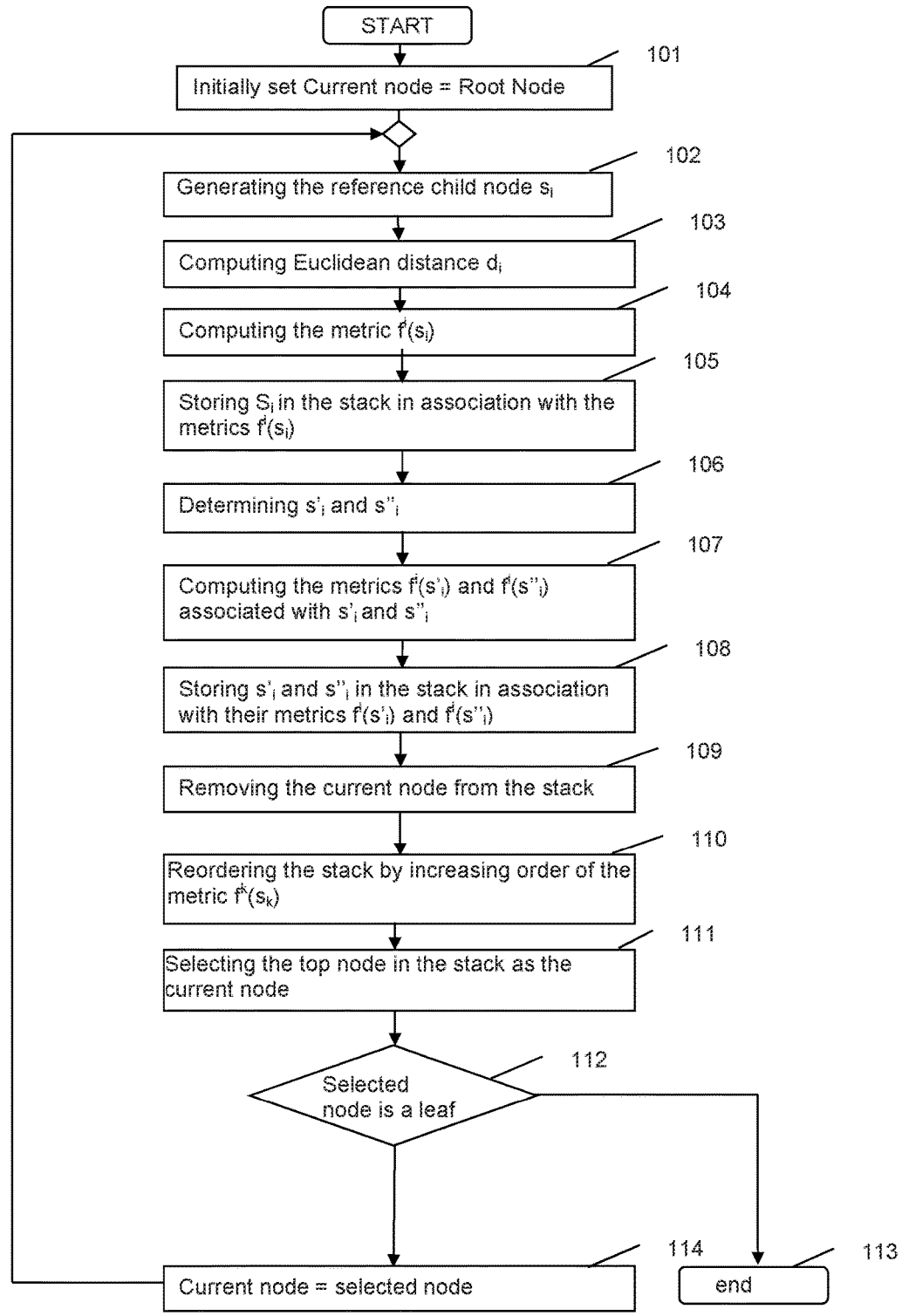
FIG. 1 is a flowchart depicting the decoding tree generation method according to certain embodiments of the invention.

According to the various embodiments of the invention, there is provided decoding tree generation methods and systems for generating a decoding tree from a received signal where each path from a root node to a leaf node represents a possible transmitted signal, according to a Best-First search strategy. Such a decoding tree may be used in a decoding device (also referred to as hereinafter as a "zigzag stack decoder") according to the Best-First tree search strategy to determine the closest vector to the received signal according to the Maximum Likelihood (ML) criterion.

The decoding tree generation method is based on generating at each level of the decoding tree (also referred to as a "search tree" hereinafter) a reduced set of nodes corresponding to the received signal. For an increasing constellation size and a high number of antennas, a traditional Stack decoder requires a high computational complexity (as described in "A fast sequential decoding algorithm using a stack" or "A unified framework for tree search decoding: rediscovering the sequential decoder"). The decoding tree generation method according to the various embodiments of the invention significantly reduces such computational complexity by reducing the number of child nodes generated for each current node to at most three nodes.

To obtain the decoding tree structure, the decoding tree construction method iteratively generates a set of at most three child nodes for each current node being processed, the current node being selected as the top node of the stack at each iteration, and stores the generated child nodes in the stack. For each generated child node, a metric may be further computed which represents the cost of the child node and is stored together with the child node in the stack.

More specifically, the decoding tree generation method may generate the set of three child nodes for each current node being processed by a first computed "reference" child node $s_n$ (corresponding to the ZF-DFE point designating the "Zero-Forcing-Decision Feedback Equalizer" point at level i=n) based on the Euclidean distance from the received vector to the hyperplanes defined by the channel generator matrix, and from this reference child node $s_n$, determining at most two neighbor nodes by zigzagging around the reference point.

In the following description of the various embodiments of the invention, the child nodes of a node $s_i$ (level i) will be referred to as the components $s_{i-1}$ (level i-1).

Instead of storing at each tree level i all the constellation points corresponding to the received vector (e.g. n constellation points in a $2^n$ QAM (Quadrature Amplitude Modulation) as is done by conventional stack decoders, the decoding tree construction method according to the various embodiments only stores, at each level of the tree, a triple of nodes comprising the node corresponding to the projection of the received vector on the corresponding hyperplane ($s_i$) and two neighbor nodes ($s'_i=s_i-p$ and $s''_i=s_i+p$) determined by zigzagging around the reference node $s_i$. Given the integer nature of the decoded symbols, the components $s_i$ take integer values and the zigzagging approach is based on selecting the two neighbors by subtracting and/or adding a positive parameter p from/to the value of the reference node S.

As used herein, a "node" refers to an element of a decoding tree data structure representing constellation points of the received signal corresponding to a constellation such as a $2^q$ QAM. Specifically, a node comprises an integer value representing a component of a symbol of the received data signal (the received data signal may be represented according to a real-valued representation). In the following description, the term "node" or "node value" will be similarly used to designate a component of a symbol of the received data signal. The first node of the tree is referred to as the root node. According to the decoding tree generation method, each node of the decoding tree can have at most three child nodes which are located below it in the tree, while conventional approaches generate a plurality of branches for each node, or a number of child nodes selected in a predefined interval. A node that does not have any child node is referred to as a "leaf" node and corresponds to the lowest level in the tree. Each node has at most one parent node located above it in the tree. The root node being the highest node in the tree, it does not have any parent node. The depth (or dimension) of a given node designates the length of the path from this given node up to the root node of the decoding tree. All the nodes of the decoding tree can be reached from the root node. Each path from the root node to a leaf node thus represents a possible transmitted signal. Nodes in the decoding tree represent the different possible values of the symbols $s_i$, where $s_i$, with i representing an integer ranging from n to 1, represent the real and imaginary components of the transmitted information vector.

Referring to FIG. 1, the main steps implemented by the decoding tree generation method according to certain embodiments of the invention will now be described. The decoding tree may be used for decoding a received data signal, corresponding to a transmitted data signal transported by a transmission channel associated with a channel matrix H.

The search tree (also referred to as "the decoding tree" hereinafter) may be generated through a QR decomposition of the channel matrix H (H=QR) in a pre-decoding phase, where $Q^t$ represents an orthogonal matrix and R represents the generator matrix in the decoding equivalent system, and through a multiplication of the received signal by $Q^t$. Given the upper triangular structure of the matrix R, the ML optimization problem is solved by performing a tree-search based on the generation of the decoding tree.

The generation of the decoding tree implements at least one iteration of the following steps, for a current node of the tree stored in the stack. The method initially starts with the root node as the current node. The first current node is therefore the root node (step 101).

Steps 102 to 114 are iterated for each current node being selected from the top of the stack to generate the triple of child nodes for which the current node is the parent node. Each iteration is thus associated with a level i of the decoding tree (i=n to 1). The parameter i may be decremented for each new iteration, depending on the top node selected in the stack.

The first iteration of the decoding tree method is thus implemented to determine the child nodes $\{s_n, s'_n, s''_n\}$ of the root node $s_{root}$ at a first level i=n.

The subsequent iterations of the decoding tree method are implemented to determine at most three child nodes $\{s_i, s'_i, s''_i\}$ at a level i of a current node corresponding to the top node in the stack, where $s_i$ corresponds to the reference child node and $s'_i$ and $s''_i$ correspond to a first and second neighboring child nodes.

In step 102, the reference child node $s_i$ at level i is generated from the received vector ỹ representing the received data signal (initially $s_i = s_n$ for the first level i=n).

It should be noted that the reference child node obtained for the first level i=n corresponds to the $n^{th}$ component of the ZF-DFE point (ZF-DFE is the acronym for "Zero-Forcing-Decision Feedback Equalizer").

In step 103, the Euclidean distance $d_i$ corresponding to the projection of the received vector ỹ to the layer of the symbol $s_i$ is determined.

In step 104, the metric $f^i(s_i)$ associated with the node $s_i$ is computed (the metric is also referred to as the "cost") according to predefined criteria. In certain embodiments, the metric $f^i(s_i)$ may be computed from the Euclidean distance $d_i$. More particularly, the metrics $f^i(s_i)$ may be computed from the weight metrics ($w(s_i)$) associated to branch ($s_{i+1}$, $s_i$) which may depend on the Euclidean distance $d_i$.

In step 105, the node $s_i$ is stored in the stack in association with the metric $f^i(s_i)$. Additional information related to the nodes may be stored in the stack in association with each node. Such node information may include for example auxiliary parameters related to the node such as the node path and/or the node depth in the decoding tree, and/or the Euclidean distance determined for the node.

The first and second neighbor child nodes $s'_i = s_i - p$ and $s''_i = s_i + p$ (p representing a predefined integer value) may be determined by zigzagging around the reference node $s_i$ in step 106.

In step 107, the metric $f^i(s'_i)$ associated with the node $s'_i$ and the metric $f^i(s''_i)$ associated with the neighbor node $s''_i$ are computed.

In step 108, the neighbor node $s'_i$ and the neighbor node $s''_i$ are stored in the stack, each in association with its respective metric $f^i(s'_i)$ and $f^i(s''_i)$, and possibly in association with additional node information (e.g. node path).

In step 109, the current node is removed from the stack.

In step 110, the stack is reordered by an increasing order of the metrics $f^k(s_k)$ so that the node $s_i$ having the lowest metric $f^i(s_i)$ is stored in the top of the stack.

In step 111, the top node of the stack is selected as the current node in order to generate its child nodes.

In step 112, it is determined if the selected node is a leaf node. If the selected node is a leaf node (i.e. not having any child node), the method is terminated in step 113.

Otherwise, in step 114, the selected node is set as the current node and steps 102 to 114 may be repeated for the newly selected node (which represents the node having the lowest metric in the stack) to generate the triple of child nodes including the reference child node $s_j$, and the two neighbor child nodes $s'_j = s_j - p$ and $s''_j = s_j - p$, at the next level j of the decoding tree with j being comprised between n-1 to 1. The next processed level j depends on the top node selected in the stack.

Each iteration of steps 102 to 114 thus provides a path between the root node and a new leaf node stored in the stack.

The data signal can then be estimated by taking into account the node information stored in the stack, and in particular the path(s) stored in the stack. For example according to a binary estimation (hard decision), the construction of the tree implements a single iteration of steps 102 to 114 enabling a single path to be determined corresponding to a hard estimation of the transmitted data signal. In the case of a probabilistic estimation (soft decision), the decoding method may deliver soft-output information in the form of Log-Likelihood Ratio (LLR) values. In this case, several iterations of steps 102 to 114 may be performed. Each repetition delivers a different path from the root node to leaf nodes. These different paths may then be stored in an auxiliary stack together with their paths. A probabilistic estimation of the information signal can then be determined based on these paths.

The decoding tree method thus enables a zigzag construction of the decoding tree which significantly reduces the decoding complexity. The decoding tree is constructed so as to store the metrics of the nodes in the stack and possibly auxiliary parameters which obviates the need for recalculating the metrics related to a node each time the node is visited.

Accordingly, the search area and the number of nodes in the search tree are reduced.

Even if the invention is not limited to such an application, the invention has particular advantages when integrated in a receiver, for example for the decoding of data transmitted in a MIMO (Multiple Input Multiple Output) channel or for the detection of multiple users.

Figure 2:
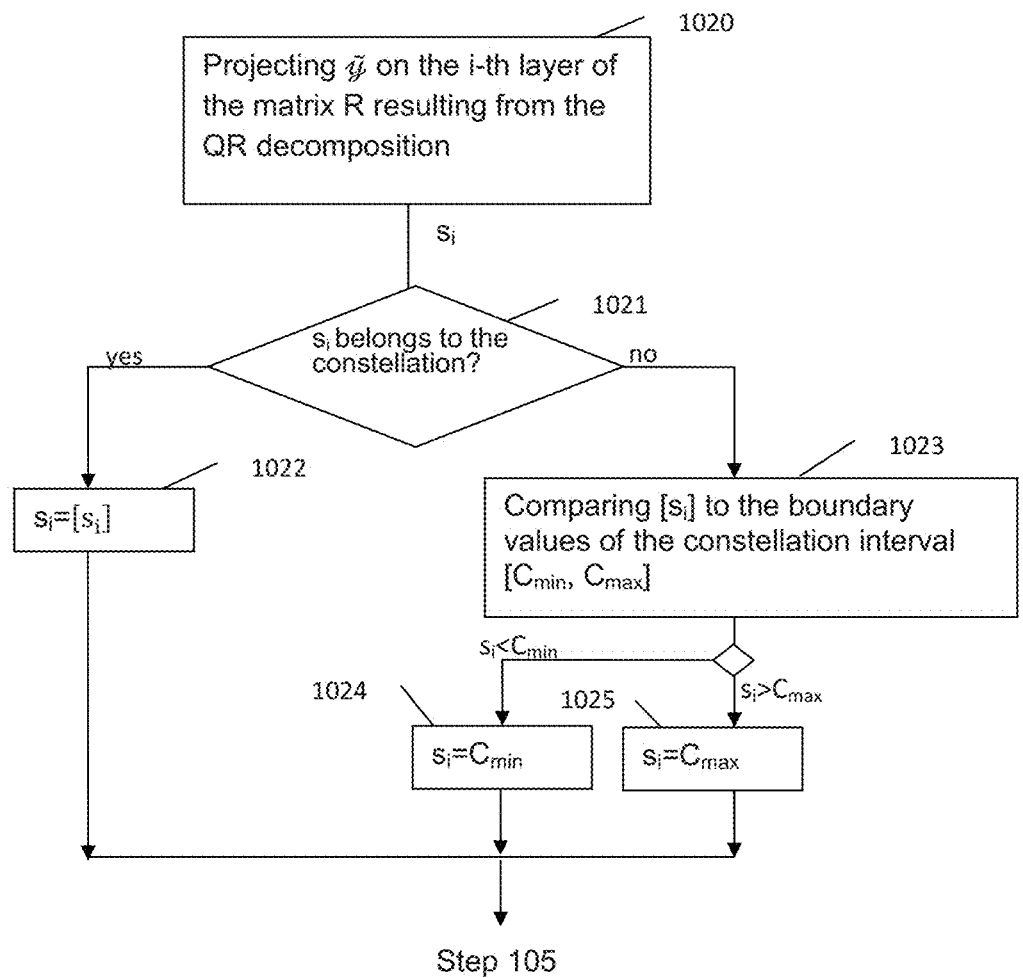
FIG. 2 is a flowchart depicting the step of determining the reference child node at a given level of the tree, according to certain embodiments.

FIG. 2 is a flowchart depicting the step of determining the reference child node $s_i$ (step 102 of FIG. 2) at a given level i of the tree.

In step 1020, the reference child node $s_i$ at level i may be generated by performing the projection of the received vector ỹ on a given layer of the upper triangular matrix R used to perform the QR decomposition of the channel matrix H (H=QR) in a pre-decoding phase, where Q represents an orthogonal matrix.

In certain embodiments, the reference child node $s_i$ may be generated by performing the projection of the received vector $\tilde{y}$ on the $i^{th}$ layer of the upper triangular matrix R.

In addition, the generation of the reference child node may take into account values of the tree nodes comprised in the path from the root node $s_n$ to the current node $s_i$.

Specifically, for i=n (first iteration of steps 102 to 114 corresponding to the generation of the child nodes at the level n), the first component $s_n$ at level n may be determined according to equation (1):

$$s_n = \left\lceil \frac{\tilde{y}_n}{R_{nn}} \right\rfloor \quad (1)$$

In equation (1), $R_{nn}$ represents the $n^{th}$ layer of the upper triangular matrix R (hyperplane), $\tilde{y}_n$ represents the $n^{th}$ component of the received signal $\tilde{y}$, and the notation $\lceil x \rfloor$ designates the nearest integer to [x].

For the subsequent iterations of decoding tree generation method node at a level i=n-1, ..., 1, the component $s_i$ may be generated such that:

$$s_i = \left\lceil \frac{1}{R_{ii}} \left( \tilde{y}_i - \sum_{j=i+1}^{n} R_{ij} s_j \right) \right\rfloor \quad (2)$$

The component $s_{n-1}$ is accordingly computed from the value of the component $s_n$, which corresponds to the parent node and to the current top node in the stack. It should be noted that, as the nodes are ordered according to their metrics, the selected top node may not correspond to the ZF-DFE point and as a result the generated symbol $s_{n-1}$ may not necessarily correspond to the $(n-1)^{th}$ component of the ZF-DFE point.

The decoding method may be applicable to decode finite or infinite lattices in $\mathbb{Z}^n$, the value of each node in the tree corresponding to the component of a symbol belonging to a constellation having a predefined range between a minimum threshold $C_{min}$ and a maximum threshold $C_{max}$). In embodiments where finite lattices are decoded (finite constellations), such as with QAM modulation, information symbols $s_i$ are carved from a finite alphabet and their real and imaginary parts, which correspond to the detected symbols over the tree, belong to the finite interval $I=[C_{min}, C_{max}]$. For example, in embodiments using a q-QAM modulation, the symbols $s_i$ belong to the interval $I_c=[\pm 1, \pm 2, \pm 3, \pm\sqrt{q}-1]$ and the nodes in the search tree corresponding to the used constellation symbols belong to the infinite set $I=[0, 1, 2, 3, \ldots, \sqrt{q}-1]$ where $C_{min}=0$ and $C_{max}=\sqrt{q}-1$.

In such embodiments, in order to guarantee that the estimated vector belongs to the considered constellation, a condition related to the nearest integer to the symbol $s_i$ ($\lceil s_i \rfloor$) as obtained in step 1020 and to the bound constraints $C_{min}$ and $C_{max}$ is checked each time a child node is generated (reference node $s_i$ or one of the two neighbor nodes $s'_i$ and $s''_i$) in step 1021.

Specifically, in step 1021, it is determined if the symbol $s_i$ as determined in step 1020 belongs to the constellation. If the symbol $s_i$ belongs to the constellation (i.e. $C_{min} \leq \lceil s_i \rfloor \leq C_{max}$), then the reference child node $s_i$ is set to the nearest integer to the symbol $s_i$ (namely $\lceil s_i \rfloor$) in step 1022.

Otherwise, if the symbol $s_i$ does not belong to the constellation (step 1021), in step 1023 the nearest integer to the symbol $\lceil s_i \rfloor$ is compared to the boundary values of the constellation interval $[C_{min}, C_{max}]$ in step 1023:

If $\lceil s_i \rfloor < C_{min}$, the reference child node $s_i$ is set to $C_{min}$ in step 1024;

If $\lceil s_i \rfloor > C_{max}$, the reference child $s_i$ is set to $C_{max}$ in step 1025.

Figure 3:
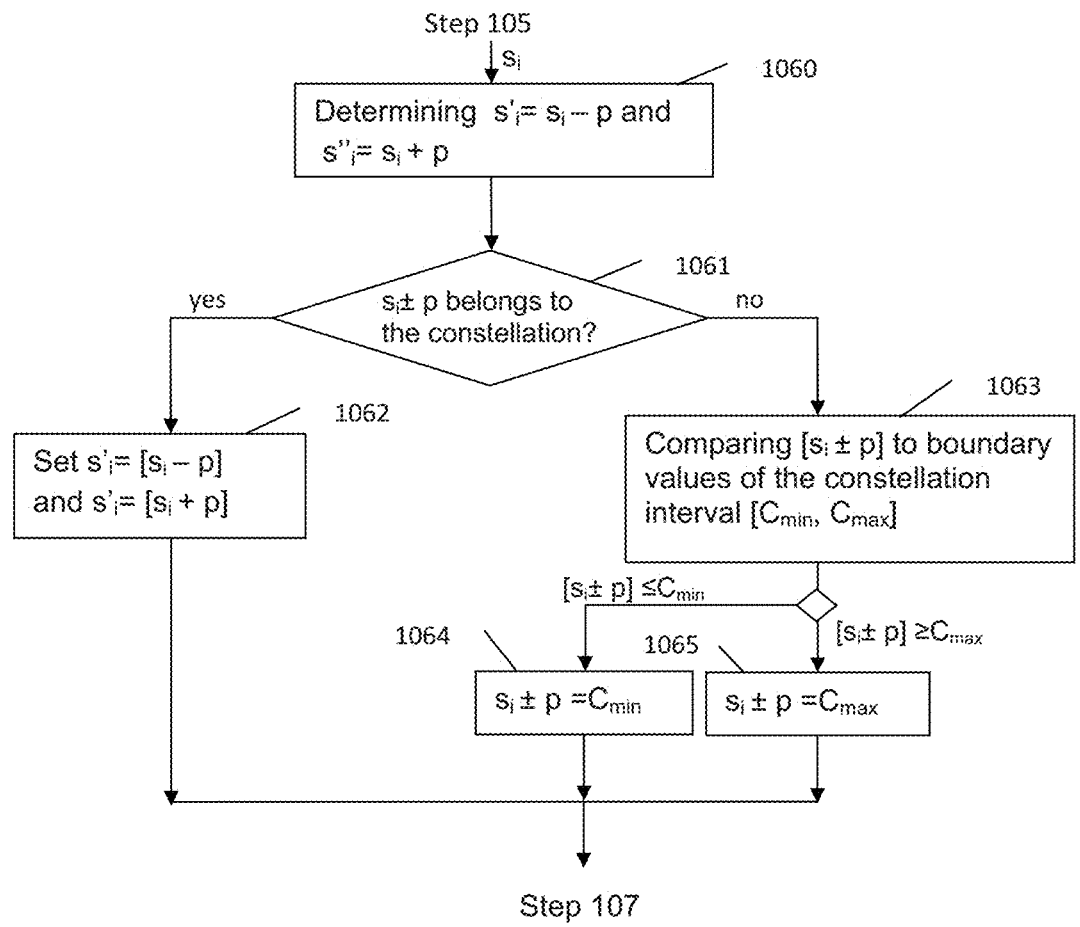
FIG. 3 is a flowchart depicting the step of determining the two neighbor child nodes of a reference node generated at a given level of the tree, according to certain embodiments.

FIG. 3 is a flowchart depicting the step of determining the neighbor child nodes $s'_i$ and $s''_i$ from the reference node $s_i$ (step 106 of FIG. 1), according to embodiments where the constellation is finite.

In step 1060, the symbols $s'_i = s_i - p$ and $s''_i = s_i + p$ are determined from the symbol $s_i$, where p designates a predefined integer parameter (also referred to as the "zigzag" parameter).

It should be noted that in certain applications, the "zigzag" parameter p may be allowed to vary in a predefined manner and may take different values depending on the level in the tree, and/or the iterative step, and/or dependent upon the different degrees of freedom exploited in the communication system, such as space, time or frequency.

In certain embodiments, the parameter p may be set to 1. This enables a reshaping of the received signal to be performed at the receiver side so as to be able to perform the lattice closest point search in $\mathbb{Z}$. With such reshaping, the shaping constraints may limit the decoded symbols to an interval $I=[C_{min}, C_{max}]$ where $C_{min}=0$ and $C_{max}=1,3,5$, etc, depending on the constellation. In such embodiments, when a tree-search algorithm is performed, the points may be tested in this boundary interval using a path of 1 (i.e. p=1). Accordingly, setting p as equal to 1 ensures that points are not skipped in the constellation that can correspond to the ML solution.

However, the invention is not limited to a parameter p equal to 1. Depending on the application of the invention, the parameter p may be set to other values. For example, if no reshaping is needed at the receiver side, the path p may be superior to 1 (hence neighboring nodes are visited).

In step 1061, for the symbol $s_i - p$ (respectively $s_i + p$), it is determined if the symbol $s_i - p$ (respectively $s_i + p$) belongs to the constellation, by determining if the nearest integer to the symbol $\lceil s_i - p \rfloor$ (respectively $\lceil s_i + p \rfloor$) is comprised between $C_{min}$ and $C_{max}$. If the symbol $s_i - p$ (respectively $s_i + p$) belongs to the constellation (step 1062), then the child neighbor node $s'_i$ (respectively $s''_i$) is set to the symbol $s_i - p$ (respectively $s_i + p$) in step 1062.

Otherwise, if the symbol $s_i - p$ (respectively $s_i + p$) does not belong to the constellation (step 1063), in step 1063, the symbol $s_i + p$ (respectively $s_i + p$) is compared to the boundary values of the constellation interval $[C_{min}, C_{max}]$ as follows:

If $\lceil s_i - p \rfloor < C_{min}$ (respectively $\lceil s_i + p \rfloor < C_{min}$), the reference child node $s_i - p$ (respectively $s_i + p$) is set to $C_{min}$ in step 1064;

If $\lceil s_i - p \rfloor > C_{max}$ (respectively $\lceil s_i + p \rfloor > C_{max}$), the reference child node $s_i - p$ (respectively $s_i + p$) is set to $C_{max}$ in step 1065.

In one application of the invention to a multi-antenna system to decode a signal received by the multi-antenna system (MIMO), with $n_t$ transmit and $n_r$ receive antennas using spatial multiplexing, the data signal $y_c$ received as a complex-valued vector is equal to $H_c s_c + w_c$, with $H_c$, $s_c$ and $w_c$ corresponding respectively to the complex value of the channel matrix H, the vector s representing the transmitted data signal and the noise vector w. The received signal $y_c$ may be then transformed into a real-valued representation, for example according to equation (3):

$$y = \begin{bmatrix} \mathcal{R}(H_c) & -\mathcal{J}(H_c) \\ \mathcal{J}(H_c) & \mathcal{R}(H_c) \end{bmatrix} \begin{bmatrix} \mathcal{R}(s_c) \\ \mathcal{J}(s_c) \end{bmatrix} + \begin{bmatrix} \mathcal{R}(w_c) \\ \mathcal{J}(w_c) \end{bmatrix} \quad (3)$$

In equation (3), $\mathcal{R}(.)$ and $\mathcal{J}(.)$ denote respectively the real and imaginary parts of a complex-valued vector. The equivalent channel output can then be written as:

$$y = Hs + w \quad (4)$$

In embodiments where a length-T Space-Time code is used, the channel output can be written in the same form of equation (1) with the equivalent channel matrix $H_{eq}$ given by:

$$H_{eq} = H_c \Phi \quad (5)$$

In equation (5), $\Phi \in \mathbb{C}^{n_t T \times n_t T}$ corresponds to the coding matrix of the underlying code. For ease of presentation and given that both uncoded and coded schemes result in a same real-valued lattice representation, the following description will be made with reference to the spatial multiplexing and symmetric case with $n_t = n_r$ and $n = 2n_t$.

According to the equivalent system obtained in (5), the received signal can be viewed as a point of the lattice generated by H and perturbed by the noise vector w. Optimal ML detection is solved for the closest vector in the n-dimensional lattice generated by H according to the minimization problem:

$$\hat{s} = \operatorname{argmin}_{s_c \in QAM} \| y - Hs \|^2 \quad (6)$$

In such MIMO systems, a tree search may be performed based on the decoding tree generated according to the decoding tree generation method in a zigzag stack decoder. Before transmitting the signal to the zigzag stack decoder, a predecoding may be performed using a QR decomposition of the channel matrix such that H=QR where Q designates the orthogonal matrix and R designate the upper triangular matrix. Given the orthogonality of Q, equation (4) can be rewritten in the following form:

$$\tilde{y} = Q^t y = Rs + Q^t w \quad (7)$$

The ML decoding problem then amounts to solving the equivalent system given by:

$$\hat{s} = \operatorname{argmin}_{s_c \in QAM} \| \tilde{y} - Rs \|^2 \quad (8)$$

Figure 4:
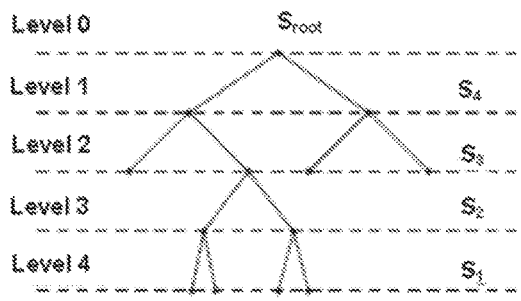
FIG. 4 illustrates an exemplary reduction of the search area obtained with the decoding tree generation method in 4-dimensional lattice.

It should be noted that the triangular structure of R, as such, reduces the search of the closest point to a sequential tree-search as illustrated in the example of FIG. 4 corresponding to a tree-search in 4-dimensional lattice, i.e. for $n_t = n_r = 2$.

In the example of FIG. 4, the nodes in the tree represent the different possible values of the symbols $s_i$. The symbols $s_i$ with i=1, . . . , n represent the real and imaginary components of the information vector $s_c$. A tree branch is represented by two consecutive nodes $(s_{i+1}; s_i)$.

In certain embodiments, the metrics $f(s_i)$ associated with the reference child node $(s_i)$ may be computed from the weight metrics $(w(s_j))$ of the nodes in the tree comprised in the path from the root node $s_n$ to the current node $s_i$, in step 104.

In particular, the metric associated with a reference child node $(s_i)$ at level i ($i^{th}$ decoded symbol) may be determined as the cumulated weight $cw(s_i)$ determined from the sum of the weight metrics $\omega(s_j)$ of the nodes in the tree comprised in the path $s^{(i)}$ from the root node $s_n$ to the current node $s_i$ (due to the triangular structure of matrix R, the search starts from the component $s_n$, where n designates the dimension of the channel matrix).

As the cumulated weight $cw(s_i)$ of a node $s_i$ is equal to the sum over all weights for different nodes forming the path $s^{(i)}$, it represents the metric of the path. A path of depth i in the tree designates the vector of length n−i+1 defined by $s^{(i)} = (s_n, s_{n-1}, \ldots, s_i)$. A node being in depth n is a leaf node.

The weight metric $w(s_j)$ of a node at a level j of the tree can be determined as the Euclidean distance between the $j^{th}$ component of the vector $\tilde{y}$ representing the received signal and the vector $(s_n \ldots s_j)$ comprising the node values of the tree from the root node $s_n$ to the node $s_j$ at level j according to equation (10):

$$w(s_j) = |\tilde{y}_j - \Sigma_{k=j}^n R_{jk} s_k|^2 \quad (10)$$

Accordingly, the cumulated weight $cw(s_i)$ for a node $s_i$ may be determined as:

$$cw(s_i) = \Sigma_{j=i}^n w_j(s_j) = \Sigma_{j=i}^n |\tilde{y}_j - \Sigma_{k=j}^n R_{jk} s_k|^2 \quad (11),$$

For a leaf node, the cumulated weight $cw(s_1)$ corresponds to the Euclidean distance between the received signal $\tilde{y}$ and $s^{(1)}$, which is equal to $|\tilde{y} - R_s^{(1)}|^2$.

In such an embodiment, the ML metric minimization of (8) amounts to a search of the path in the tree having the least cumulated weight.

In an alternative embodiment, the cumulated weight function $cw(s_i)$ may be determined by taking into account a bias parameter b, where b has a real and positive value ($b \in \mathbb{R}^+$). Specifically, the bias parameter b may be deduced from the weight function, such that equation 10 is replaced by the following equation (parameterized weight $w(s_j)$ for a node $s_i$ at level i in the tree):

$$w(s_j) = |\tilde{y}_j - \Sigma_{k=i}^n R_{jk} s_k|^2 - b.j \quad (12)$$

Accordingly, in this alternative parameterized approach, the cumulated weight $cw(s_i)$ for a node $s_i$ may be determined as:

$$cw(s_i) = \Sigma_{j=i}^n w_j(s_j) = \Sigma_{j=i}^n (|\tilde{y}_j - \Sigma_{k=j}^n R_{jk} s_k|^2 - b.j) \quad (13)$$

In particular, the application of a bias b equal to zero (b=0) provides the ML solution.

The value of the bias parameter may be determined arbitrarily or depending on the channel variance $\sigma^2$ according to equation (11) as described in "Lattice Sequential Decoder for Coded MIMO Channel: Performance and Complexity Analysis". W. Abediseid and Mohamed Oussama Damen. CoRR abs/1101.0339 (2011):

$$b = \sigma^2 \log\left(\frac{4}{\pi \sigma^2}\right) \quad (14)$$

Such parameterized embodiment of the decoding search tree makes it possible to obtain a wide range of decoding performance (thus complexity) by taking into account the bias parameter b in the weight function. Particularly, for a value of the bias parameter larger than 10, the decoder offers the same error performance of the ZF-DFE detector while requiring lower complexity.

The decoding tree generation method may be applied to perform soft detection, in soft-output decoders. For instance, soft-output decoding in MIMO systems depends on soft information delivered using A Posteriori Probability techniques in the form of Log-Likelihood Ratio (LLR) values. In order to adapt the decoding tree generation method to soft-output detection, in addition to the existing main stack, a second fixed-size stack may be further used. When a leaf node reaches the top of the original stack, the method may return the ML solution and continue its processing. Each time a leaf node reaches the top of the stack, this node may be stored in the second stack. The obtained near-ML solutions may then be used, together with the ML solution to generate the LLR values for soft-output detection.

Although not limited to such applications, the invention has particular advantages when applied to MIMO detection. Indeed, the zigzag stack decoder can be implemented joint to a parallelization of the channel output such that the steps of the decoding method according to the various embodiments of the invention can be performed simultaneously on two independent subsystems obtained by separating the real and imaginary parts of the channel output and the detected symbols. Additionally, in such MIMO applications, the zigzag decoder can be implemented joint to pre-processing techniques applied to the channel matrix such as ordering and lattice reduction.

Figure 5:
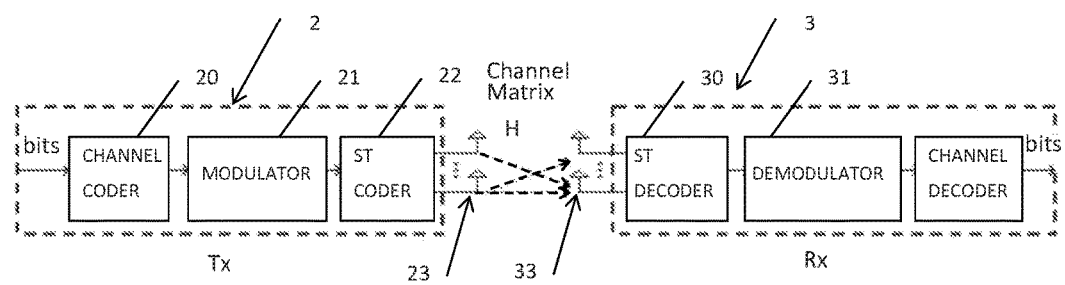
FIG. 5 schematically represents an exemplary system implementing the decoding method.

A MIMO wireless network includes a plurality of stations, each station including a transmitter and a receiver including one or more antennas as illustrated in FIG. 5. Each station may communicate with other stations through a wireless connection.

The MIMO wireless network 1 may use space/time codes in transmission to distribute the symbols modulated over various degrees of freedom of the channel.

The transmitter 2 can transmit a signal to a receiver 3 by means of a noisy MIMO channel. The data transmitter 2 can in particular be integrated in the stations. The transmitter 2 may comprise for example:
- a channel coder 20 for providing convolutional codes,
- a QAM modulator 21 for delivering symbols;
- a space/time coder 22 for delivering a code word;
- Ntx transmission antennas 23, in which each transmission antenna may be associated with an OFDM modulator.

The transmitter 2 codes a binary signal received as input using a convolutional code provided by the channel coder 20. The signal is then modulated by the modulator 21 according to a modulation scheme (for example, a quadrature amplitude modulation nQAM). The modulator 21 can also implement a modulation scheme by phase shift, for example of the nPSK type, or any modulation. The modulation results in the generation of complex symbols belonging to a group of symbols $s_i$. The modulated symbols thus obtained are then coded by the space-time coder 22 to form a code word STBC, such as the Golden Code ("The Golden Code: A 2×2 Full-Rate Space-Time Code with Non-Vanishing Determinants", J.-C. Belfiore, G. Rekaya, E. Viterbo, IEEE Transactions on Information Theory, vol. 51, no. 4, pages 1432-1436, April 2005). The STBC code may be based on a complex matrix of dimension Ntx*T, in which Ntx is the number of transmission antennas and T is the time length of the STBC code, or on a spatial multiplexing (the modulated symbols are directly sent to the transmission antennas).

The code word thus generated is converted from the time domain to the frequency domain and distributed over the Ntx transmission antennas. Each dedicated signal is then modulated by a respective OFDM modulator, then transmitted over the corresponding transmission antenna 23, optionally after filtering, frequency transposition and amplification.

The receiver 3 can be also integrated in the stations. The receiver 3 may be configured to receive a signal y transmitted by the transmitter 2 in a wireless channel. The channel may be noisy (for example channel with additive white Gaussian noise (AWGN) subjected to fading. The signal transmitted by the transmitter 2 may be further affected by echoes due to the multiple paths and/or the Doppler effect.

In one exemplary embodiment, the receiver 3 may comprise:
- Nrx receiving antennas 33 for receiving the signal y, each receiving antenna being associated with a respective OFDM demodulator; the OFDM demodulators (Nrx demodulators) are configured to demodulate the received signal observed at each receiving antenna and delivering demodulated signals. A frequency/time converter may be used to perform a reverse operation of the time/frequency conversion implemented in transmission, and to deliver a signal in the frequency domain;
- a space/time decoder 30 configured to deliver a decoded signal;
- a demodulator 31 configured to perform a demodulation associated with a decoding.

It should be noted that the receiver 3 implements a reverse processing of the processing implemented in transmission. Accordingly, if a single-carrier modulation is implemented in transmission instead of a multi-carrier modulation, the Nrx OFDM demodulators are replaced by corresponding single-carrier demodulators.

The skilled person will readily understand that the various embodiments of the invention are not limited to specific applications. Exemplary applications of this new decoder include, with no limitation, multi-user communication systems, MIMO decoding in configurations implementable in wireless standards such as the WiFi (IEEE 802.11n), the cellular WiMax (IEEE 802.16e), the cooperative WiMax (IEEE 802.16j), the Long Term Evolution (LTE), the LTE-advanced, the 5G ongoing standardization, and optical communications.

Figure 6:
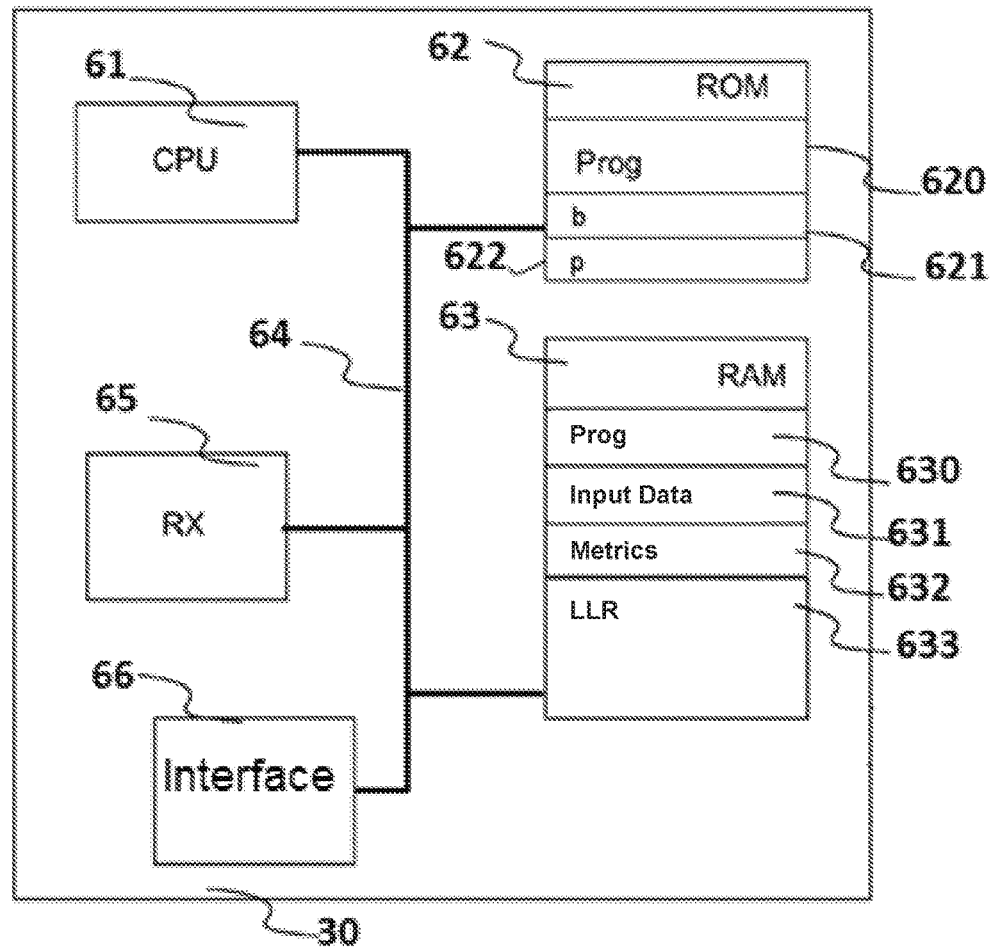
FIG. 6 schematically shows an example of the architecture of a decoder implementing a specific embodiment of the invention.

FIG. 6 represents an exemplary architecture of a space/time decoder 30 of the receiver 3. As shown, the space/time decoder 30 may include the following elements, which are linked together by a data and address bus 64:
- a microprocessor 61 (or CPU), which is, for example, a digital signal processor (DSP);
- a non-volatile memory 62 (or ROM, read-only memory);
- a random access memory RAM 63;
- an interface 65 for receiving input signals coming from the frequency/time converter;
- an interface 66 for transmitting decoded data to the demodulator 31.

The non-volatile ROM memory 62 may include for example:
- a register "Prog" 620;
- a bias parameter "b" 621.
- the zigzag parameter "p" 622.

The algorithms for implementing the method according to this embodiment of the invention can be stored in the program 620. The CPU processor 1 may be configured to download the program 620 to the RAM memory and runs the corresponding instructions.

The RAM memory 63 may include:
- in a register Prog 630, the program run by the microprocessor 61 and downloaded in an active mode of the space/time decoder 30;
- input data in a register 631;
- data relating to the nodes in a register 632, corresponding to the stack;
- likelihood probabilities or LLR in a register 633;

The data stored in the register 632 may include, for a node of the decoding tree, the metric and optionally auxiliary metrics associated with this node (path from the root to said node, and/or the depth in the tree).

According to another embodiment, the decoding technique can be implemented according to a hardware-only configuration (for example, in one or more FPGA, ASIC or VLSI integrated circuits with the corresponding memory) or according to a configuration using both VLSI and DSP.

Figure 7:
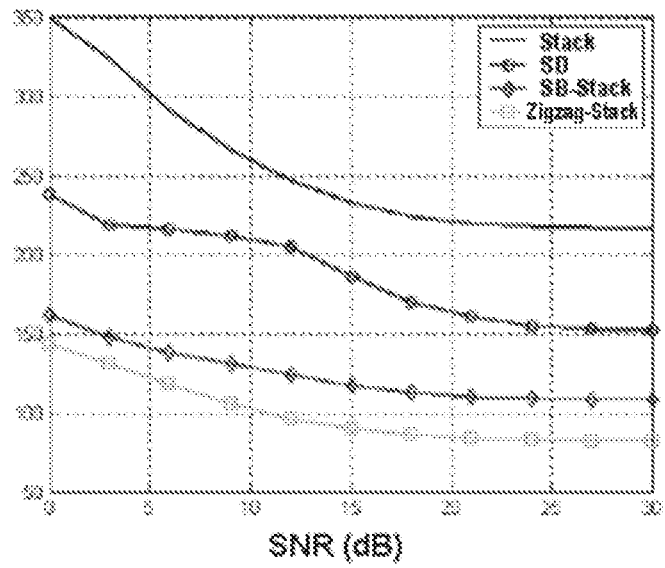
FIGS. 7 and 8 are diagrams illustrating the total complexity obtained with a zigzag stack decoder according to certain embodiments.
Figure 8:
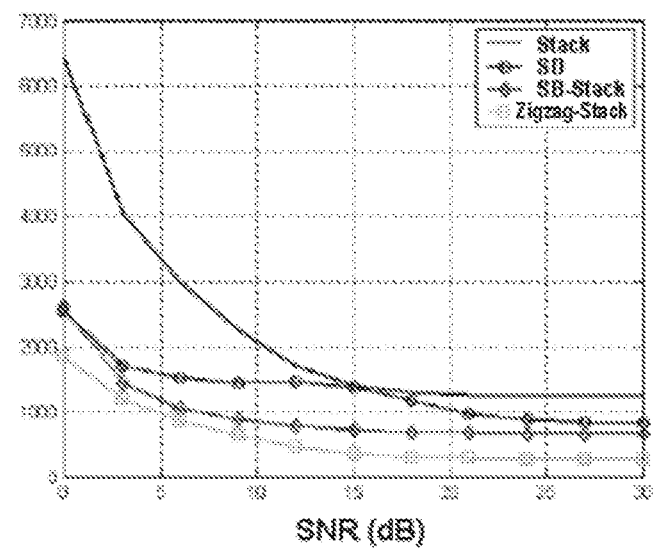

It has been observed, through simulations, that a decoder (referred to as a "zigzag stack decoder") based on a decoding tree generated by the decoding tree construction methods, according to the various embodiments of the invention, provides similar ML performance as the Sequential Decoder, the Stack decoder and the SB-Stack decoder. To assess the computational complexity of such decoder, the total number of multiplications for the pre-decoding and the search phases has been counted. A 16-QAM modulation and 2×2 and 4×4 MIMO schemes have been used in the simulations. FIGS. 7 and 8 show the obtained performance and specifically show the significant complexity gain offered by the decoder over the existing ones. The improved sequential decoder provides an average complexity gain of 46% over the conventional Stack Decoder for $n_t=n_r=2$ and at least 50% when $n_t=n_r=4$.

Figure 9:
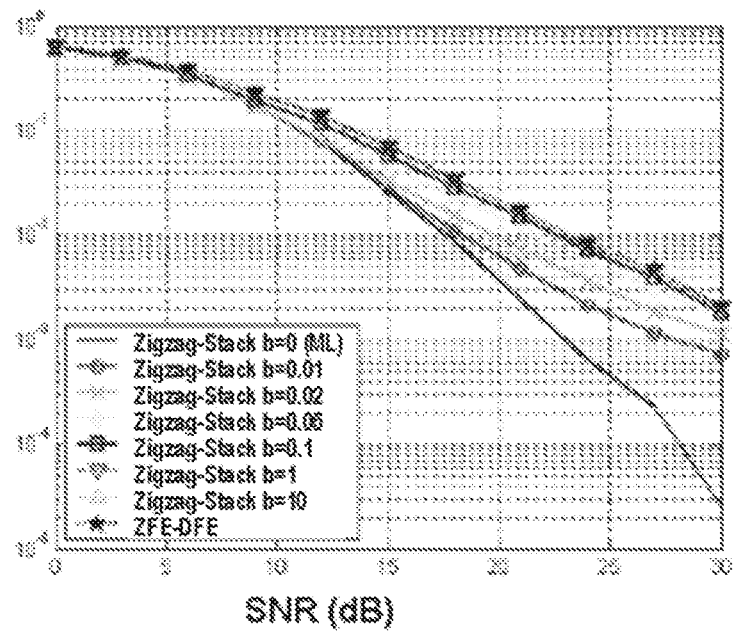
FIGS. 9 and 10 illustrate the numerical results obtained from a simulation of the zigzag stack decoder according to certain embodiments where the metric of each generated child node is determined based on a bias parameter.
Figure 10:
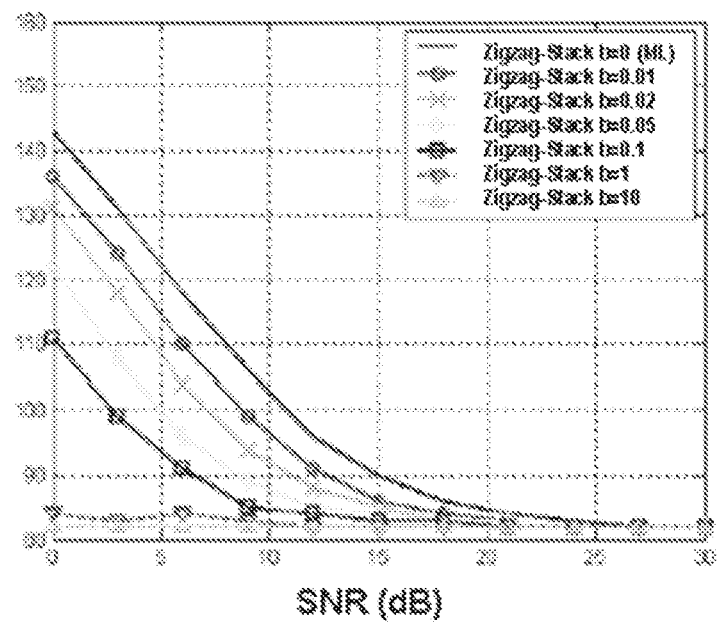

FIGS. 9 and 10 represent the numerical results obtained from a simulation of the zigzag stack decoder, in certain embodiments of the invention where the metric of each generated child node is determined based on a bias parameter b. The numerical results are based on evaluating the Symbol Error Rate and the total computational complexity for different values of the bias parameter b. As illustrated in FIGS. 7 and 8, small values of the bias b allow to obtain near-ML performance which is reached for b=0. When the bias increases, the complexity may be reduced at the cost of having worse SER performance. For a bias b≥10, the Zigzag Stack returns ZF-DFE performance with a highly reduced complexity.

While embodiments of the invention have been illustrated by a description of various examples, and while these embodiments have been described in considerable detail, it is not the intention of the applicant to restrict or in any way limit the scope of the appended claims to such detail. Additional advantages and modifications will readily appear to those skilled in the art. The invention in its broader aspects is therefore not limited to the specific details, representative methods, and illustrative examples shown and described. Accordingly, departures may be made from such details without departing from the spirit or scope of applicant's general inventive concept.

In particular, the various embodiments of the invention are not limited to particular types of detection, and apply both to hard and soft detection.

In addition, program code described herein may be identified based upon the application or software component within which the program code is implemented in a specific embodiment of the invention. It should be further appreciated that the various features, applications, and devices disclosed herein may also be used alone or in any combination.

The invention claimed is:

1. A method of decoding a received data signal in a communication system, wherein said method comprises:
iteratively constructing a decoding tree, each node of said decoding tree corresponding to a component of a symbol of said data signal, and being associated with a metric,
wherein said step of iteratively constructing the decoding tree implements at least one iteration of the following steps, for a current node of the tree stored in the top of a stack:
generating a reference child node ($s_i$) of said current node from said vector representing the received data signal, from the reference child node ($s_i$), generating a first neighbor child node by subtracting a positive integer parameter (p) from the value of the reference node ($s_i$), and a second neighbor child node by adding said positive integer parameter (p) to the value of the reference child node ($s_i$);
storing in said stack at most three child nodes among the reference child node and said first and second neighbor child nodes, each child node being stored in the stack in association with node information comprising a predetermined metric, the nodes in the stack being ordered by increasing values of metrics;
removing the current node from said stack;
selecting the top node of said stack as the new current node;
wherein the value of each node in the tree corresponds to the component of a symbol belonging to a given constellation having a predefined range between a minimum threshold and a maximum threshold, each step of generating a child node comprising setting the value of the child node based on said maximum and minimum thresholds wherein said method further comprises determining an estimation of said data signal from the node information stored in said stack.

2. The method of claim 1, wherein said received data signal corresponds to a transmitted data signal transported by a transmission channel, said transmission channel being associated with a channel matrix (H) of a given dimension (n) and a QR decomposition being previously applied to said channel matrix where Q designates an orthogonal matrix and R an upper triangular matrix, wherein said step of generating the reference child node comprises projecting said vector representing the received signal on a layer of said upper triangular matrix.

3. The method of claim 2, wherein said reference child node is further generated from the values of the tree nodes comprised in the path from the root node to the current node.

4. The method as claimed in claim 3, wherein said step of generating said reference child node comprises determining the reference child node from the nearest integer of a quantity $$\frac{1}{R_{ii}}\left(\tilde{y}_i - \sum_{j=i+1}^{n} R_{ij}s_j\right),$$

where i designates the level of the reference child node in the tree, $R_{ii}$ represents the component (i,i) of the upper triangular matrix R, $R_{ij}$ represents the component (i,j) of the upper triangular matrix R where j varies from i+1 to n, and $\tilde{y}_i$ represents the $i^{th}$ component of the received signal $\tilde{y}$.

5. The method as claimed in claim 4, wherein said step of generating the reference child node comprises determining a metric ($f(s_i)$) associated with the reference child node ($s_i$) from the weight metrics (($w(s_j)$) of the nodes in the tree comprised in the path from the root node to the current node.

6. The method as claimed in claim 5, wherein said metric associated with the reference child node ($s_i$) is represented by the cumulated weight determined from the sum of the weight metrics ($w(s_j)$) of the nodes in the tree comprised in the path from the root node to the current node, the weight metric ($w(s_j)$) of a node at a given level j of the tree being determined as the Euclidean distance between the $j^{th}$ component of the vector $\tilde{y}$ representing the received signal and a vector (($s_n \ldots s_j$)) comprising the nodes of the tree from the root node to the node at level j.

7. The method as claimed in claim 5, wherein said metric associated with the reference child node ($s_i$) is represented by the cumulated weight determined from the sum of the weight metrics ($w(s_j)$) of the nodes in the tree comprised in the path from the root node to the current node, the weight metric ($w(s_j)$) of a node at a level j of the tree being determined as the difference between:
- the Euclidean distance between the $j^{th}$ component of the vector ỹ representing the received signal and a vector ($s_n \ldots s_j$) comprising the values of the nodes of the tree from the root node to the node at level j, and
- the product of a predefined bias parameter b by the level j, wherein the predefined bias parameter is a real and positive value.

8. The method as claimed in claim 7, wherein said step of storing at most three child nodes in the stack further comprises storing auxiliary parameters in association with each node in the stack, said auxiliary parameters comprising the node path, and wherein said estimation of the data signal is determined from said node paths stored in the stack.

9. The method as claimed in claim 8, wherein said step of selecting the top node further comprises determining if the node selected in the stack is a leaf node and wherein the method comprises:
- performing the next iteration if the selected node is not a leaf node, and
- terminating the iterations if the selected node is a leaf node.

10. The method as claimed in claim 1, wherein the method comprises, for each iteration, storing each path from a root node to a leaf node in an auxiliary stack,
said estimation of the data signal being further determined from the node information stored in said auxiliary stack.

11. The method as claimed in claim 10, wherein each of said steps of generating a child node among the reference child node, the first child node and the second child node comprises determining if the generated nearest integer to the value of the child node is comprised between said minimum threshold and said maximum threshold, the method further comprising for at least one of the three generated child nodes:
- if the generated nearest integer to the value of the child node is comprised between said minimum threshold and said maximum threshold, setting the child node to the nearest integer value within the constellation range.

12. The method as claimed in claim 11, wherein the method further comprises:
- if the generated nearest integer to the value of the child node is lower than the predefined minimum threshold, setting the child node value as equal to said minimum threshold;
- if the generated nearest integer to the value of child node is higher than said maximum threshold, setting the child node value as equal to the maximum threshold.

13. The method of claim 12, wherein said communication system is a multi-antenna system and said transmission channel is associated with a channel matrix H of a given dimension, said received data signal $y_c$ being equal to $H_c s_c + w_c$, with $H_c$, $s_c$ and $w_c$ corresponding respectively to the complex value of the channel matrix H, of the vector s representing the transmitted data signal and of a noise vector w, and wherein the received data signal is previously transformed into a real-valued representation, said representation being defined by the following formula:

$$y = \begin{bmatrix} \mathcal{R}(H_c) & -\mathcal{J}(H_c) \\ \mathcal{J}(H_c) & \mathcal{R}(H_c) \end{bmatrix} \begin{bmatrix} \mathcal{R}(s_c) \\ \mathcal{J}(s_c) \end{bmatrix} + \begin{bmatrix} \mathcal{R}(w_c) \\ \mathcal{J}(w_c) \end{bmatrix} = Hs + w$$

where $\mathcal{R}(.)$ and $\mathcal{J}(.)$ denote respectively the real and imaginary parts of the complex-valued vector specified as parameter.

14. A computer program product for decoding a received data signal, the computer program product comprising:
- a non-transitory computer readable storage medium; and
- instructions stored on the non-transitory computer readable storage medium that, when executed by a processor, cause the processor to:
  - iteratively construct a decoding tree, each node of said decoding tree corresponding to a component of a symbol of said data signal, and being associated with a metric, wherein said step of iteratively constructing the decoding tree implements at least one iteration of the following steps, for a current node of the tree stored in the top of a stack:
  - generating a reference child node ($s_i$) of said current node from said vector representing the received data signal,
  - from the reference child node ($s_i$), generating a first neighbor child node by subtracting a positive integer parameter (p) from the value of the reference node ($s_i$), and a second neighbor child node by adding said positive integer parameter (p) to the value of the reference child node ($s_i$);
  - storing in said stack at most three child nodes among the reference child node and said first and second neighbor child nodes, each child node being stored in the stack in association with node information comprising a predetermined metric, the nodes in the stack being ordered by increasing values of metrics;
  - removing the current node from said stack;
  - selecting the top node of said stack as the new current node;

wherein the value of each node in the tree corresponds to the component of a symbol belonging to a given constellation having a predefined range between a minimum threshold and a maximum threshold, each step of generating a child node comprising setting the value of the child node based on said maximum and minimum thresholds,
wherein said instructions further cause the processor to determine an estimation of said data signal from the node information stored in said stack.

15. A device for decoding a received data signal, wherein the device comprises:
- at least one processor; and
- a memory coupled to the at least one processor and including instructions that, when executed by the at least one processor, cause the device to iteratively construct a decoding tree, each node of said decoding tree corresponding to a component of a symbol of said data signal, and being associated with a metric, wherein said step of iteratively constructing the decoding tree implements at least one iteration of the following steps, for a current node of the tree stored in the top of a stack:
  - generating a reference child node ($s_i$) of said current node from said vector representing the received data signal,
  - from the reference child node ($s_i$), generating a first neighbor child node by subtracting a positive integer parameter (p) from the value of the reference node ($s_i$), and a second neighbor child node by adding said positive integer parameter (p) to the value of the reference child node ($s_i$);

storing in said stack at most three child nodes among the reference child node and said first and second neighbor child nodes, each child node being stored in the stack in association with node information comprising a predetermined metric, the nodes in the stack being ordered by increasing values of metrics;

removing the current node from said stack;

selecting the top node of said stack as the new current node;

wherein the value of each node in the tree corresponds to the component of a symbol belonging to a given constellation having a predefined range between a minimum threshold and a maximum threshold, each step of generating a child node comprising setting the value of the child node based on said maximum and minimum thresholds, wherein said instructions, when executed by at least one processor, further cause the device to determine an estimation of said data signal from the node information stored in said stack.

\* \* \* \* \*

UNITED STATES PATENT AND TRADEMARK OFFICE
CERTIFICATE OF CORRECTION

PATENT NO. : 10,484,133 B2
APPLICATION NO. : 15/514576
DATED : November 19, 2019
INVENTOR(S) : Asma Mejri and Ghaya Rekaya-Ben Othman It is certified that error appears in the above-identified patent and that said Letters Patent is hereby corrected as shown below:

In the Claims

In Claim 13, Column 20, Line 6, delete "$w(.)$ and $w(.)$" and insert -- $\mathcal{R}(.)$ and $\mathcal{J}(.)$ --.

Signed and Sealed this
Eighteenth Day of February, 2020

Andrei Iancu
*Director of the United States Patent and Trademark Office*